United States Patent
Wilson et al.

(10) Patent No.: US 8,510,485 B2
(45) Date of Patent: Aug. 13, 2013

(54) LOW POWER DIGITAL INTERFACE

(75) Inventors: Thomas James Wilson, Pleasanton, CA (US); Yutaka Hori, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 326 days.

(21) Appl. No.: 11/947,723

(22) Filed: Nov. 29, 2007

(65) Prior Publication Data

US 2009/0063736 A1     Mar. 5, 2009

Related U.S. Application Data

(60) Provisional application No. 60/967,185, filed on Aug. 31, 2007.

(51) Int. Cl.
*G06F 3/00*  (2006.01)
*G06F 5/00*  (2006.01)

(52) U.S. Cl.
USPC .......... 710/61; 710/52; 710/53; 710/54; 710/55; 710/56; 710/57; 710/58; 710/59; 710/60

(58) Field of Classification Search
USPC ........................................ 710/52–61
See application file for complete search history.

(56) References Cited

U.S. PATENT DOCUMENTS

| | | | |
|---|---|---|---|
| 5,084,637 A | 1/1992 | Gregor | |
| 5,315,178 A * | 5/1994 | Snider | 326/44 |
| 5,361,392 A | 11/1994 | Fourcroy et al. | |
| 5,483,261 A | 1/1996 | Yasutake | |
| 5,488,204 A | 1/1996 | Mead et al. | |
| 5,812,796 A | 9/1998 | Broedner et al. | |
| 5,825,352 A | 10/1998 | Bisset et al. | |
| 5,835,079 A | 11/1998 | Shieh | |
| 5,878,234 A * | 3/1999 | Dutkiewicz et al. | 710/110 |
| 5,880,411 A | 3/1999 | Gillespie et al. | |
| 5,938,742 A | 8/1999 | Faddell et al. | |
| 5,951,635 A * | 9/1999 | Kamgar | 365/189.011 |
| 6,016,549 A * | 1/2000 | Matsushiba et al. | 713/324 |

(Continued)

FOREIGN PATENT DOCUMENTS

| | | |
|---|---|---|
| JP | 2000-16303 A | 6/2000 |
| JP | 2002-342033 A | 11/2002 |

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

(Continued)

*Primary Examiner* — Chun-Kuan Lee
(74) *Attorney, Agent, or Firm* — Fletcher Yoder PC (57) ABSTRACT

This relates to interface circuits for synchronous protocols which do not rely on a dedicated high frequency clock signal. Instead, the interface circuit may rely on a clock signal received over the interface from another device in order to transfer data between the interface and an internal buffer. Furthermore, the interface circuits can rely on a clock signal provided by a bus for a device the interface circuit is located in to transfer data between the internal buffer and the bus. The internal buffer can be, but is not limited to a FIFO. Alternatively, it can be a stack or another data structure. The internal buffer can be configured so that each of its multiple cells is a shift register. Thus, a preparatory step of moving a byte of data from the buffer to a separate shift register can be avoided.

40 Claims, 7 Drawing Sheets

(56) References Cited

U.S. PATENT DOCUMENTS

| | | | |
|---|---|---|---|
| 6,188,391 B1 | 2/2001 | Seely et al. | |
| 6,310,610 B1 | 10/2001 | Beaton et al. | |
| 6,323,846 B1 | 11/2001 | Westerman et al. | |
| 6,480,942 B1 * | 11/2002 | Hirairi | 711/156 |
| 6,686,759 B1 * | 2/2004 | Swamy | 324/765 |
| 6,690,387 B2 | 2/2004 | Zimmerman et al. | |
| 6,696,854 B2 * | 2/2004 | Momtaz et al. | 326/37 |
| 7,015,894 B2 | 3/2006 | Morohoshi | |
| 7,184,064 B2 | 2/2007 | Zimmerman et al. | |
| 2005/0215248 A1 * | 9/2005 | Brookshire | 455/426.1 |
| 2006/0020743 A1 * | 1/2006 | Au et al. | 711/101 |
| 2006/0026521 A1 | 2/2006 | Hotelling et al. | |
| 2006/0097991 A1 | 5/2006 | Hotelling et al. | |
| 2006/0171413 A1 * | 8/2006 | Kim | 370/466 |
| 2006/0197753 A1 | 9/2006 | Hotelling | |
| 2008/0059768 A1 * | 3/2008 | Hung et al. | 712/43 |

OTHER PUBLICATIONS

Rubine, D.H. (Dec. 1991). "The Automatic Recognition of Gestures," CMU-CS-91-202, Submitted in Partial Fulfillment of the Requirements of the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

* cited by examiner

LOW POWER DIGITAL INTERFACE

RELATED APPLICATIONS

The present application claims priority from provisional application Ser. No. 60/967,185 filed on Aug. 31, 2007 and entitled "LOW POWER DIGITAL INTERFACE". The above referenced provisional application is also incorporated herein by reference.

FIELD OF THE INVENTION

This relates to digital interfaces in general, and more specifically to providing energy efficient wired digital interfaces.

BACKGROUND OF THE INVENTION

There exist many wired digital interface standards for connecting digital devices. These can include, for example, universal serial bus (USB), FireWire and serial peripheral interface (SPI). There also exist physical interfaces which implement these standards. The interfaces may be included in physical devices (such as, for example, keyboards, computer mice, computer cases, mobile telephones, portable audio players, flash drives) which utilize these interfaces to communicate with other devices.

Some interfaces may be synchronous. Synchronous interfaces may require that when two or more interfaces are connected, a clock signal be sent from one interface to one or more of the other connected interfaces. An interface receiving an incoming clock signal may need to detect edges of the incoming clock signal while utilizing a different local clock signal for its electronics. In order to ensure that the edges are properly and timely detected, the interface receiving the clock signal may need to use a local clock signal that is of much higher frequency than the incoming clock signal. This may result in relatively high power dissipation as well as various expenses necessary to generate the high frequency local clock signal.

Furthermore, the requirement of a local clock signal of a significantly higher frequency than the incoming signal may limit the frequency of the incoming signal. Since data transmission may be timed in accordance with the incoming signal this may limit the rate of data transmission of the interface.

SUMMARY OF THE INVENTION

This relates to interface circuits for synchronous protocols which do not rely on a dedicated high frequency clock signal. Instead, the interface circuit may rely on a clock signal received over the interface from another device in order to transfer data between the interface and an internal buffer. Furthermore, the interface circuit can rely on a clock signal provided by a bus for a device the interface circuit is located in to transfer data between the internal buffer and the bus.

The internal buffer can be, but is not limited to a FIFO. Alternatively, it can be a stack or another data structure. The internal buffer can be configured so that each of its multiple of cells is a shift register. Thus, a preparatory step of moving a byte of data from the buffer to a separate shift register can be avoided.

The interface circuits can be configured to operate in accordance with the SPI interface. However, this is not required. Alternatively, the circuits can be configured to operate with other synchronous interface protocols (even ones that are not serial).

This further relates to various devices that include the interface circuits discussed above. For example, this can relate to computers, keyboards, computer mice, speakers, mobile telephones, portable audio and/or video players, personal data assistants, automobiles, household appliances, flash drives, etc. Also included are networks of devices comprising the interface circuits discussed above.

DETAILED DESCRIPTION OF THE PREFERRED EMBODIMENT

In the following description of preferred embodiments, reference is made to the accompanying drawings which form a part hereof, and in which it is shown by way of illustration specific embodiments in which the invention may be practiced. It is to be understood that other embodiments may be utilized and structural changes may be made without departing from the scope of the preferred embodiments of the present invention.

This relates to improving existing digital interfaces so that do not require a high frequency local clock and thus require much less power for operation. Instead, the improved interfaces can utilize a combination of an incoming clock signal and a local bus clock signal to operate.

Although embodiments of the present invention are described herein in terms of SPI interfaces, it should be understood that the present invention is not limited to SPI, but is generally applicable to any synchronous digital interfaces that traditionally require a high frequency local clock. Furthermore, the invention need not be limited to interfaces requiring wired connections but may be utilized in conjunction with various wireless synchronous interfaces, such as, for example, optical interfaces.

Figure 1:
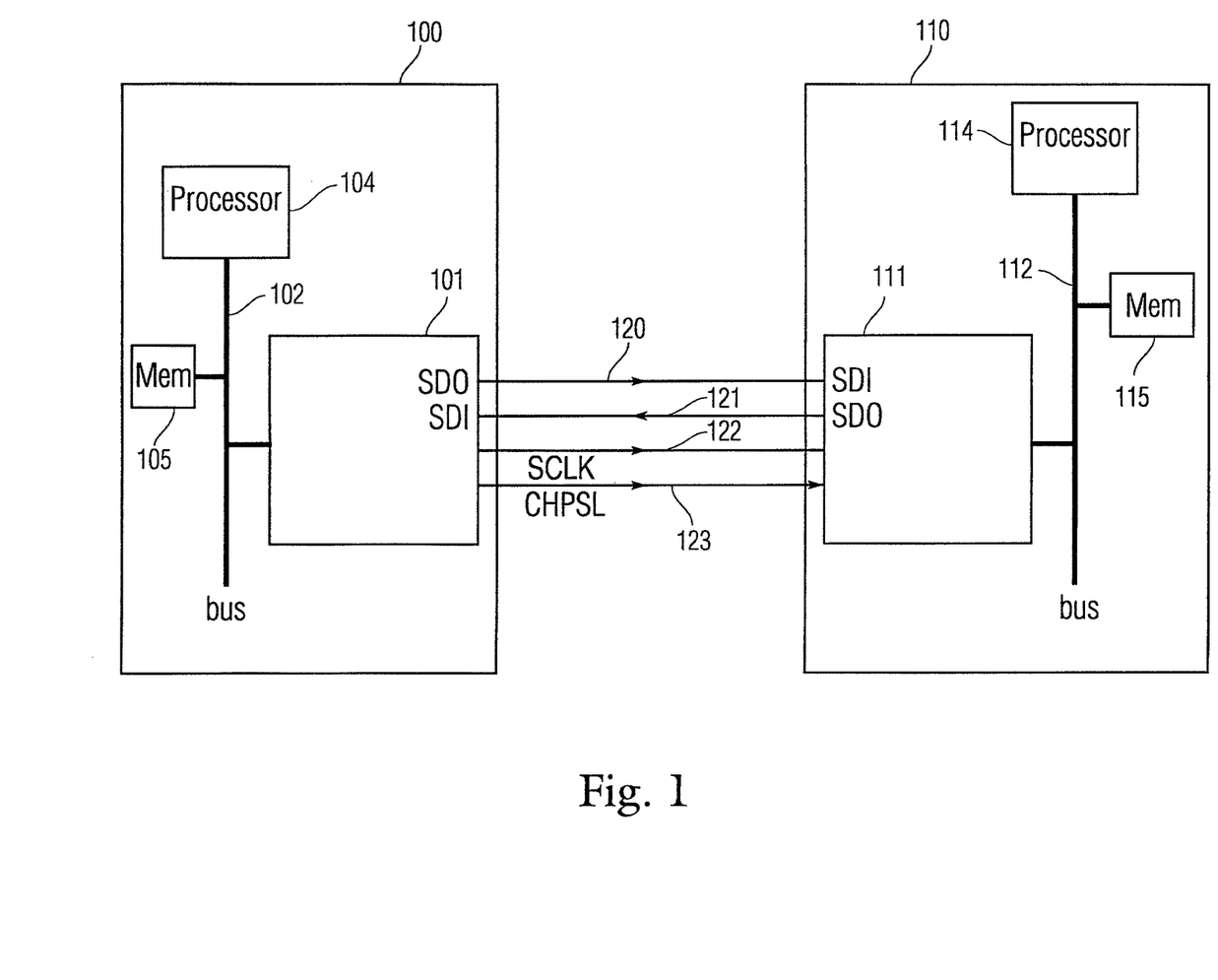
FIG. 1 is an illustration of two exemplary devices connected through an SPI interface according to one embodiment of the invention.

FIG. 1 is an illustration of devices 100 and 110 which are connected through an SPI interface. Devices 100 and 110 can be various electronic devices which may benefit from communication with other devices such as, for example, computers, keyboards, computer mice, speakers, mobile telephones, portable audio and/or video players, personal data assistants, automobiles, household appliances, flash drives, etc. Devices 100 and 110 need not be of the same type. For example, device 100 may be a computer, while device 110 may be a portable audio/video player, which may connect to the computer to download songs and/or videos.

Each device can include a SPI interface module (101 and 111, respectively) which handles communications over in accordance with the SPI protocol. Each interface module can include various electronics for transmitting and receiving data and other signals required by the SPI protocol as well as the physical plugs for a cable connecting the two devices.

Each interface module can be connected to a respective bus (102 and 112, respectively) which can connect each interface module to other modules of its device, such as a processor (104 and 114, respectively) and a memory (105 and 115, respectively). Through bus communications, each processor can send or receive data to and from its respective interface module in order to communicate with the other device. The interface module can also be connected to other modules of its device (not shown).

A SPI interface may feature two data wires. The data wires may be used to transfer data in opposite directions. Thus, data wire 120 may transfer data from device 100 to device 110 while data wire 121 can transfer data from device 121 to device 120. Accordingly, data wire 120 can be connected to a serial data out (SDO) port of interface 101 and a serial data in (SDI) port of interface 111, while data wire 121 can be connected to an SDI port of interface 111 and an SDI port of interface 101. This can allow for two streams of data to be simultaneously transmitted over the interface.

The SPI protocol can require that one device connected to an SPI interface be designated as a master while the other connected device is designated as a slave (in some cases there may be multiple slaves connected). The master can provide overall control over the transmission of data; it can, for example, determine when transmission starts and stops. In FIG. 1, interface 101 is the master.

Wire 122 can be used to transmit a clock signal. The clock signal can be generated by the master and sent to the slave. The clock signal sent over wire 122 can be referred to as an SPI clock or an SCLK to distinguish it from other clocks that may be generated within interfaces 101 and 111 and devices 100 and 110. The data sent through wires 120 and 121 can be serialized and synchronized with the SCLK signal. Thus, wires 120 and 121 may each carry a binary signal which defines a plurality of bits each new bit being signified by a change in the SCLK signal (see FIG. 2 for further details).

Wire 123 can be used to carry a chip select signal. The chip select signal is also generated by the master and sent to the slave(s). When two devices are connected (as in FIG. 1), the chip select signal can be used to activate and deactivate the connection. In other words, the connection can be considered to be switched off until the master indicates that it is active by toggling the chip select signal. When multiple devices are present, multiple chip select signals can be used by the master to determine which slave the master is communicating with by activating and deactivating various connections.

Embodiments of the present invention are generally directed to improving the power requirements of the slave. However, modern SPI interfaces can be configured to alternatively operate both as a master and a slave. Thus, embodiments of the present invention may be utilized for the majority of modern SPI interfaces (as well as the majority of interfaces configured to operate according to other synchronous interface protocols).

The interfaces of FIG. 1 can be prior art interfaces or they can be interfaces that have been improved according to embodiments of the invention.

Figure 2:
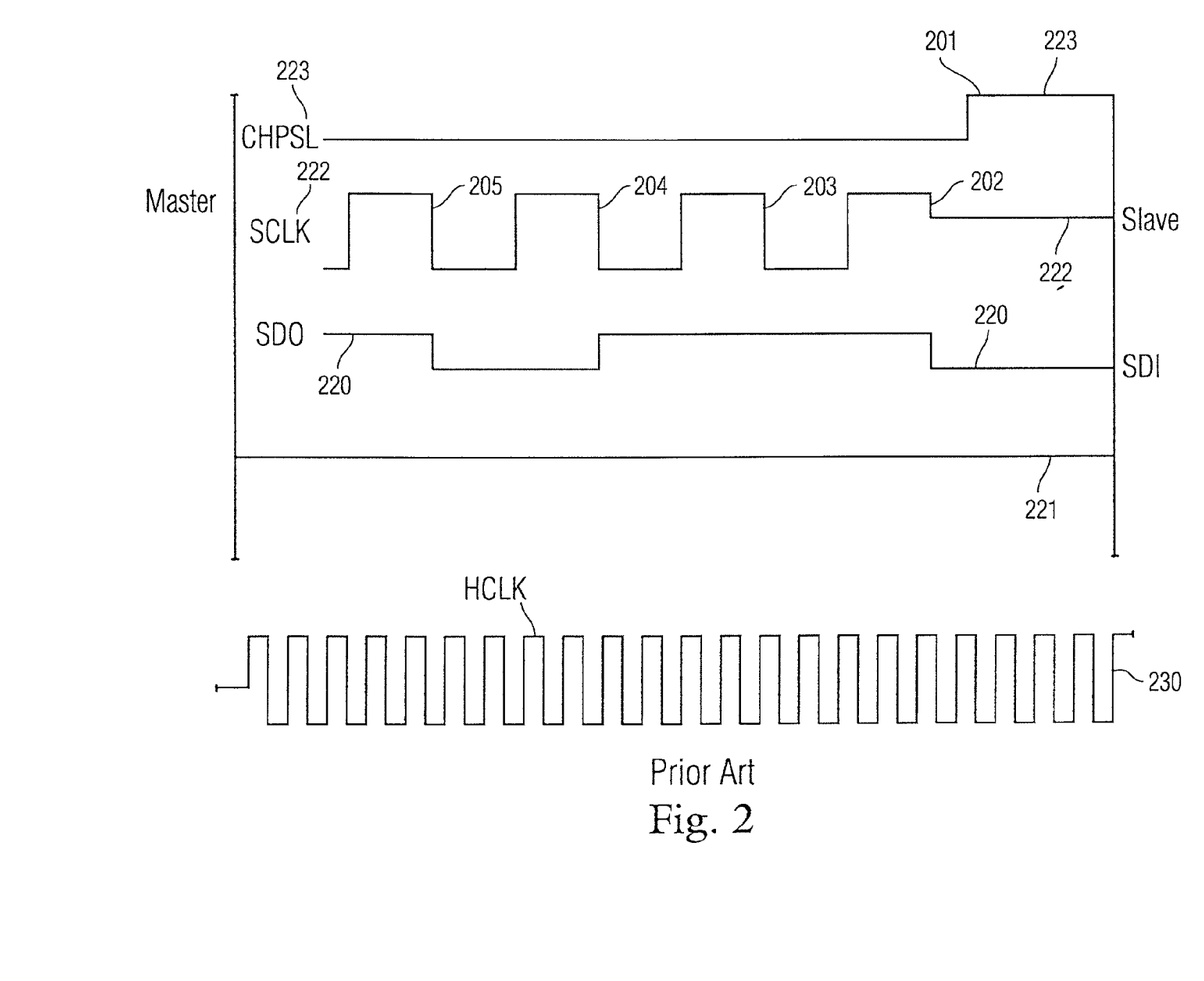
FIG. 2 is an illustration of various exemplary signals that may travel over the SPI interface.

FIG. 2 is an illustration of various exemplary signals that may travel over the SPI interface. Chip select signal 223 can propagate from the master towards the slave and can be configured to be active when low. Thus, at point 201, the master has activated the connection by setting the chip select signal low. SCLK signal 222 also propagates from the master towards the slave. It can be configured to be inactive (flat) when the connection is turned off and oscillate when the connection has been activated (i.e., when the chip select signal is sent to low). In some embodiments, the SCLK signal may be activated a short time after the chip select signal is, as shown in FIG. 2.

Also shown is one of the data signals—data signal 220. Data signal 220 can be the data signal that propagates over wire 120 or, in other words, the data signal that propagates from the master to the slave. The data signal can be inactive (e.g., low) when the connection is inactive and can include serial bit data which is synchronized in accordance with the clock. Thus, data signal 220 can signify the value of consecutive bits of data, wherein each new bit is marked by a rising edge of the clock. Thus, the data signal can be high at point 202, 203, switch to low at point 204, and switch back to high at point 205 to signify the binary value 1101.

The other data signal—the one propagating from the slave to the master—is also shown. At this point, it is entirely inactive, as the slave has yet to receive the low chip select signal which informs the slave that the connection is activated. When point 201 reaches the slave, the slave can activate data signal 221 and use it to send data to the master. The data sent over signal 221 can also be synchronized with the SCLK 223 by ensuring that the slave sends serial bits in such a manner so that the borders between consecutive bits coincide with features of the SCLK (i.e., rising edges).

Thus, the slave must be able to detect features of the SCLK in order to be able to receive and send data. This can be done by periodically sampling the SCLK signal and detecting changes in the received values. However, in order to accurately detect changes, the sampling may need to be performed at a relatively high rate in comparison to the frequency of the SCLK. Otherwise the timing of the edges of the SCLK may not be accurately detected.

Since the sampling may need to be done at a different rate than the SCLK frequency, it may need to be driven by a different clock. That different clock may also need to be of a much higher frequency than the SCLK, to ensure the needed higher frequency of sampling. Accordingly, signal 230 can represents such a different clock signal. It can be referred to as the local high frequency clock signal, or the HCLK. The HCLK can be generated by the slave and used locally by the slave. Thus, the HCLK signal is usually not sent to the master (it is shown spanning the distance between slave and master in FIG. 2 to allow for a timing comparison with the SCLK signal). As can be seen, the HCLK signal is of a much higher frequency than the SCLK signal, in order to allow for high frequency sampling of that signal.

However, the high frequency of the HCLK signal would require a lot of power for the generation of that signal as well as for operation of the logic in the slave interface that is driven by that signal. Furthermore, the requirement that the HCLK signal is of a significantly higher frequency than the SCLK signal can effectively limit the frequency of the SCLK signal to a rate much lower than would be otherwise practicable. This would in turn limit the data throughput rate of the connection.

Embodiments of the present invention improve the power and cost of the slave interface by removing the need for an HCLK signal. Some embodiments remove the need for an HCLK signal by running the slave interface entirely on the SCLK signal received from the master. However, the SCLK signal is only operable when the connection is activated.

Therefore, if the above scheme were used, the slave interface may not be able to perform any state changes while the connection is inactive. However, the slave may need to perform such preliminary state changes in order to, for example, prepare to send data when a connection activates, and/or queue data received from the bus the slave interface is connected to and intended for transmission over the SPI link.

Some embodiments provide that the leading edge of the chip select signal 223 which activates the link can be used as a first clock signal by the slave to perform one preliminary state change at the slave before the actual SCLK signal arrives and data needs to be sent and/or received. That preliminary state change can be used, for example, to prepare data for sending by loading it into a shift register.

Figure 3:
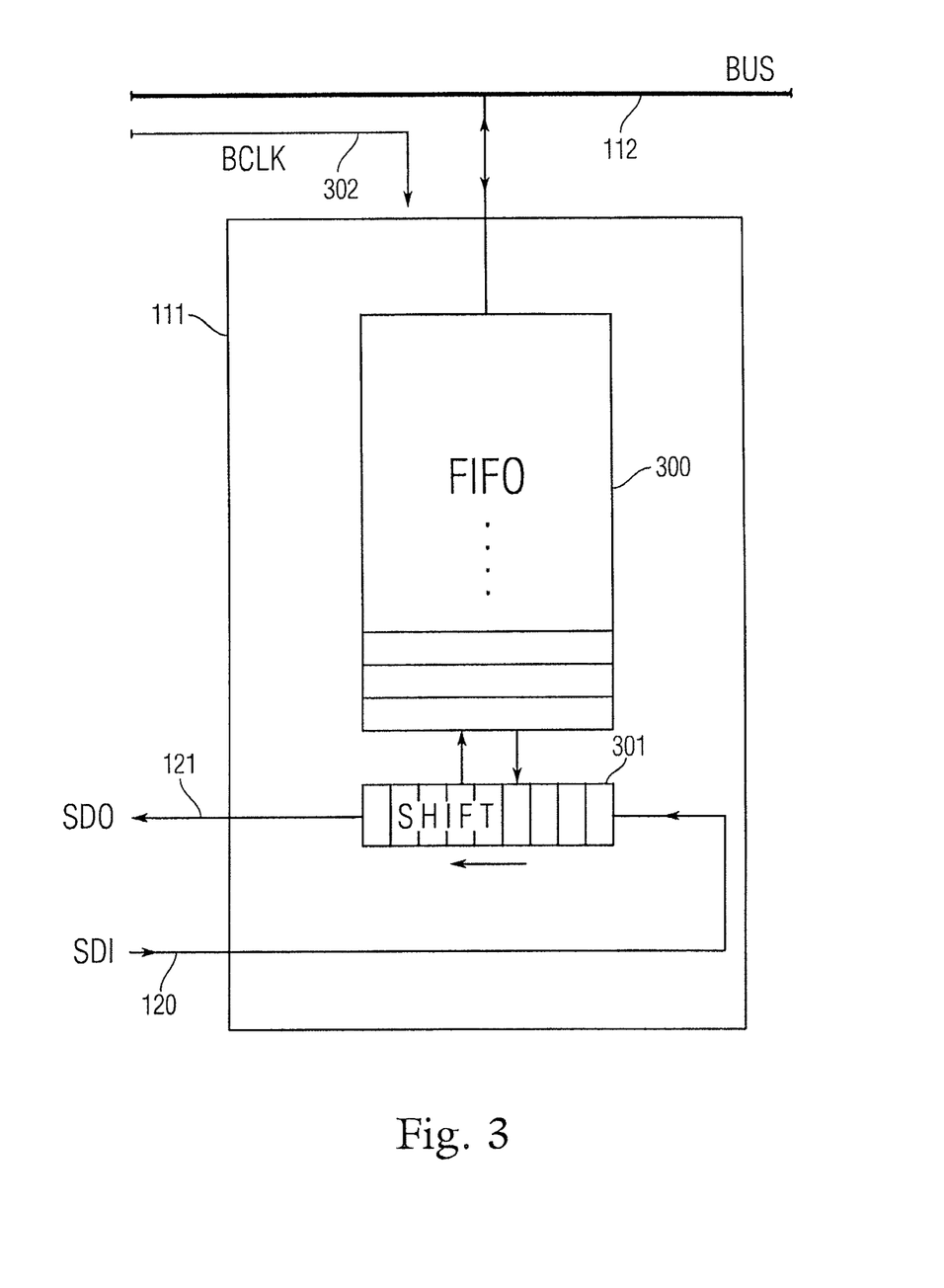
FIG. 3 is a diagram showing elements of an exemplary interface module according to one embodiment of the invention.

FIG. 3 is a diagram showing elements of an exemplary interface module. More specifically, it shows elements of a slave interface module 111 of device 110. Interface module 111 can include a first in first out module (FIFO 300). The FIFO can also be referred to as a queue.

The FIFO can be utilized to store data bytes received from device bus 112 and forward them to shift register 301. The shift register can sequentially shift the bits of the byte stored in it to the left while sending the left most bit out through the serial data output (SDO) and data wire 121. Thus, the shift register may sequentially send out all bits of the data byte loaded within it to transmit that byte over the SPI interface to the other device. Once the shift register is empty, it can load another data byte from the FIFO. The FIFO sends data bytes to the shift register on a first in first out basis. Thus, data bytes can be transmitted in the order they were received from the bus.

When receiving data from the SDI interface, the shift register may receive data comprising a sequence of bits from a serial data input (SDI) connected to wire 120 and can store the bits by shifting them to the left. Once the shift register is full, it can send a full byte of data to the FIFO, which can store the received bytes and send them to bus 112 in a first in first out order. The system depicted in FIG. 3 may use the same elements for transmitting and receiving data and it therefore may not be usable for simultaneously transmitting and receiving data. However, other systems may provide for simultaneous transmission and receipt by providing for two separate FIFOs and shift registers for transmitting and receiving.

Thus, the FIFO of FIG. 3 can comprise a plurality of memory cells configured to hold a predetermined amount of data (e.g. a byte) and various logic configured to load data from the bus and to send it to the shift register (or vice versa, when data is being received from the SPI connection).

It should be noted that in the prior art scheme discussed in connection with FIG. 3, in order for the interface to be able to transmit data, a byte of data must be loaded from the FIFO into the shift register before transmission begins. Furthermore, data may need to be loaded in the FIFO from the bus before transmission begins. This may be difficult if the interface relies solely on the SCLK because, as noted above, the SCLK arrives when data needs to be sent out (or a very short period of time before that). Thus, the SCLK does not provide a clock transition that can be used by the various latches of the shift register and the FIFO to load data before that data needs to be sent out.

According to some embodiments the chip select signal can be used to provide a transition for the shift register to load data from the FIFO. Furthermore, a clock provided by device bus 112 (i.e., bus clock, or BCLK 302) can be used to load data from the bus to the FIFO.

Figure 4:
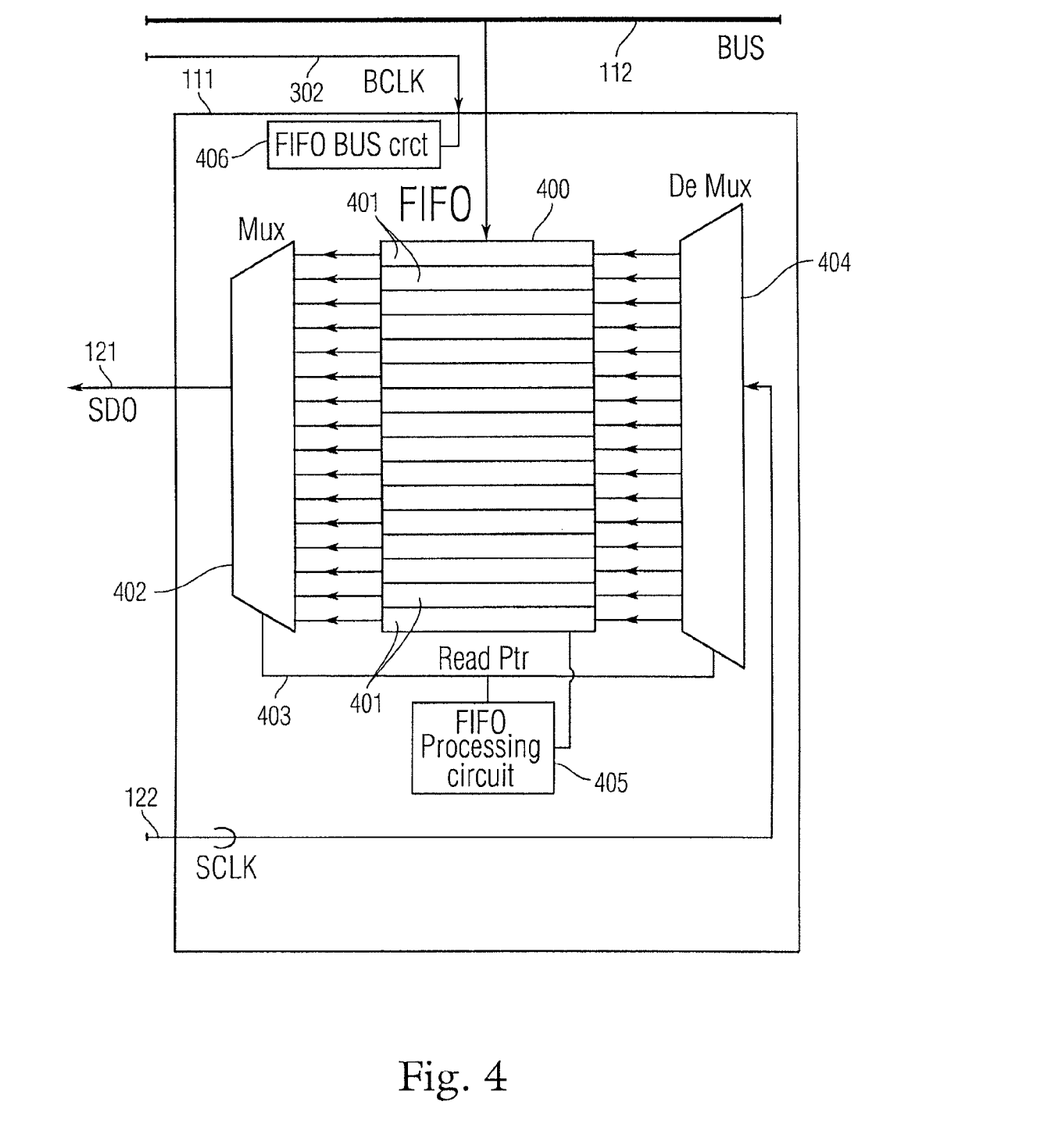
FIG. 4 is a diagram showing elements of an exemplary interface module according to one embodiment of the invention.

Other embodiments do not use the chip select signal as a clock signal but instead improve the structure of the FIFO so that no preliminary changes of state are necessary before sending data out. FIG. 4 is a diagram of such an embodiment.

The FIFO of FIG. 4 (FIFO 400) can also comprise a plurality of cells (cells 401), each of which may hold a byte. However the interface of FIG. 4 need not use a separate shift register. Instead each cell 401 of FIFO 400 can in of itself be a shift register. Thus, each cell can be capable of sequentially shifting bits out for transmission over a SPI link or sequentially receiving and shifting in bits from a SPI link in order to store incoming data. In other words, each cell of the FIFO can be capable of performing the functions of the shift register of FIG. 3.

Because data can be shifted out and sent directly from cells in the FIFO, the preliminary step of loading a shift register before sending data may not be necessary. Thus, the sending of data may commence immediately upon receiving the SCLK signal and activation of the link.

A multiplexer 402 can select a current cell which is sending data at a particular time and connect its output to the serial data output and data line 121 (there may be additional circuitry which is not shown and which may be used to strengthen or level shift the output or provide a desired impedance). Multiplexer 402 can be controlled by a read pointer signal (403) which can indicate which cell is currently active (i.e., currently being read). A demultiplexer (404) can also be provided. The demultiplexer can also be controlled by the read pointer signal and can be connected to the SCLK signal. It can send the SCLK signal to the currently active cell as indicated by the read pointer. All other cells can be disconnected from any clock signals. After passing through the demultiplexer, the SCLK signal can be connected to the clock inputs of the latches of the active cell. Thus, being connected to the SCLK, the active cell can shift according to the clock and provide a series of data bits which can in turn be sent through multiplexer 402 to the serial data output and wire 121.

All cells other than the currently active cell may be disconnected from the SCLK signal and need perform no shifting. Thus, it is ensured that only the currently active cell is shifting and no data is lost. However, some of the inactive data cells may be receiving data from the bus and be connected to another clock for that purpose (see below for more details).

When all the bits of a cell are shifted out, the read pointer can increment (or cycle back to its lowest value, if already at the highest value) so that the bits of the next cell can be transmitted. Thus, cells can be transmitted one by one until the connection is deactivated and the SCLK is turned off, or the FIFO runs out of cells with data in them. A FIFO processing circuit 405 can generate and increment the read pointer. It can also detect when all data in the FIFO has been sent and stop the transmission of data (this can happen, for example, by setting the read pointer to a predefined null value which does not select any cell for shifting and transmission when all data has been exhausted). The read pointer can be incremented based on the SCLK.

While the various cells are being read, new values received from internal bus 112 can be loaded into the cells of the FIFO. Thus, various modules in the device of interface 111 can send data for transmission over the SPI interface. The new values can be loaded by a FIFO bus circuit 406, which is itself based on the bus clock (i.e., BCLK 302).

Figure 5:
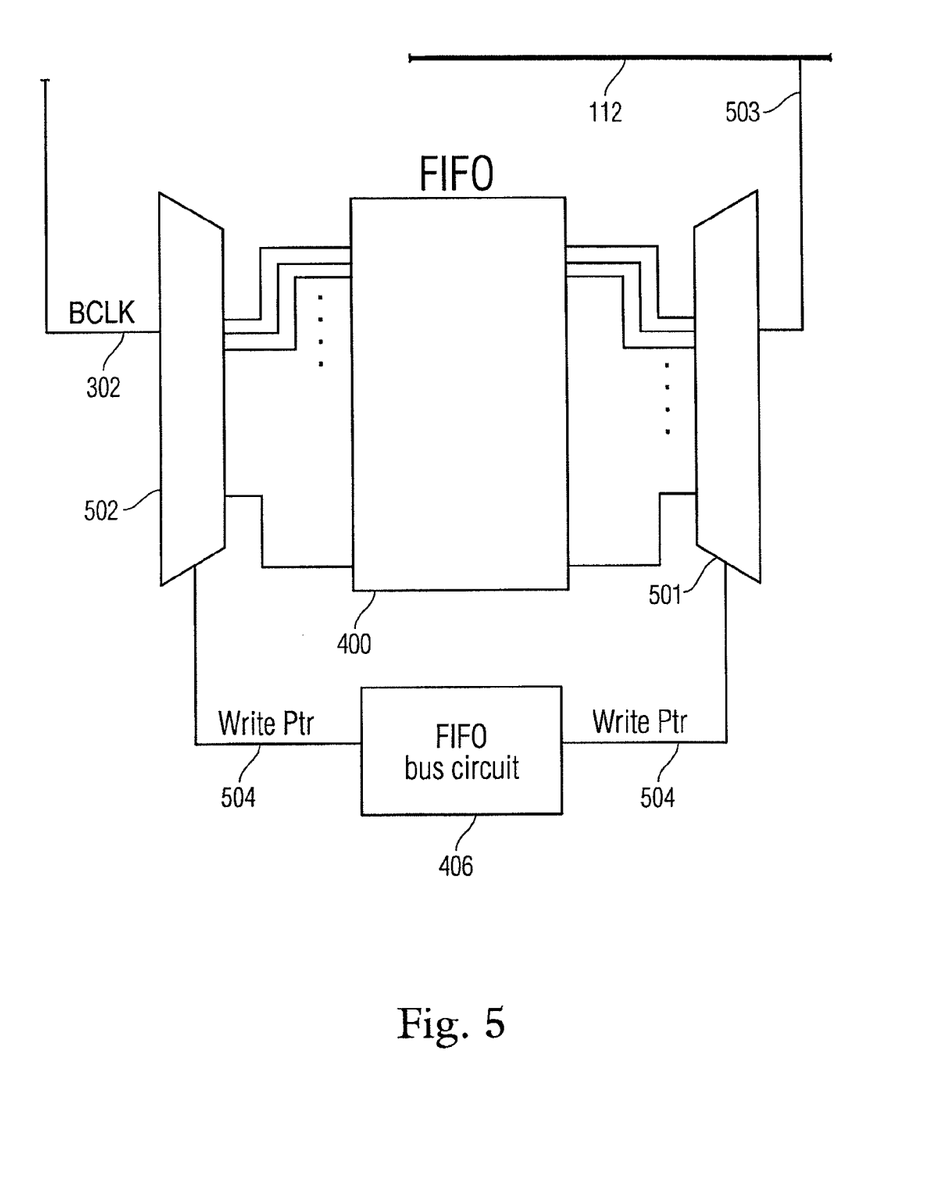
FIG. 5 is a diagram showing exemplary circuitry for storing data received from an internal bus into a FIFO of an interface according to one embodiment of the invention.

Storing data received from the bus into the FIFO is shown in more detail in FIG. 5. Data line 503, which is connected to bus 112 connects to demultiplexer 501. The bus clock 302 connects to demultiplexer 502. Both demultiplexers are controlled by a write pointer signal 504. The write pointer signal is generated by the FIFO bus circuit and indicates the next empty cell which is ready to be written into. Demultiplexer 502 provides a clock signal to a cell that is to be written to, while demultiplexer 501 provides data from the bus to the cell that is to be written to. The data may be written sequentially by shifting the cell that is being written to, or can be written in parallel by writing all bits of a cell simultaneously. In either case, the data can be written based on the bus clock BCLK. Some embodiments can provide that writing and reading may be performed simultaneously. That may not be the case for other embodiments. There may be additional logic (not shown) used to prevent conflicts at the FIFO between writing and reading signals.

There are several ways the read and write pointers can be respectively generated by the FIFO processing and bus circuits. For example, the pointers can be stored in latches and incremented on writes and reads. However, this may lead to corruptions (especially in the read pointer), because the read pointer is based on the SCLK, which is not guaranteed to be active at all times. For example, the SCLK may go inactive before the read pointer can be incremented.

Therefore, some embodiments can use a more complex scheme for generating the read and write pointers. For example, the FIFO bus circuit can detect whether each cell of the FIFO is filled with data or not and set the write pointer to the lowest cell filled with data. Similarly, the FIFO bus circuit can set the write pointer to the lowest empty cell.

Figure 6:
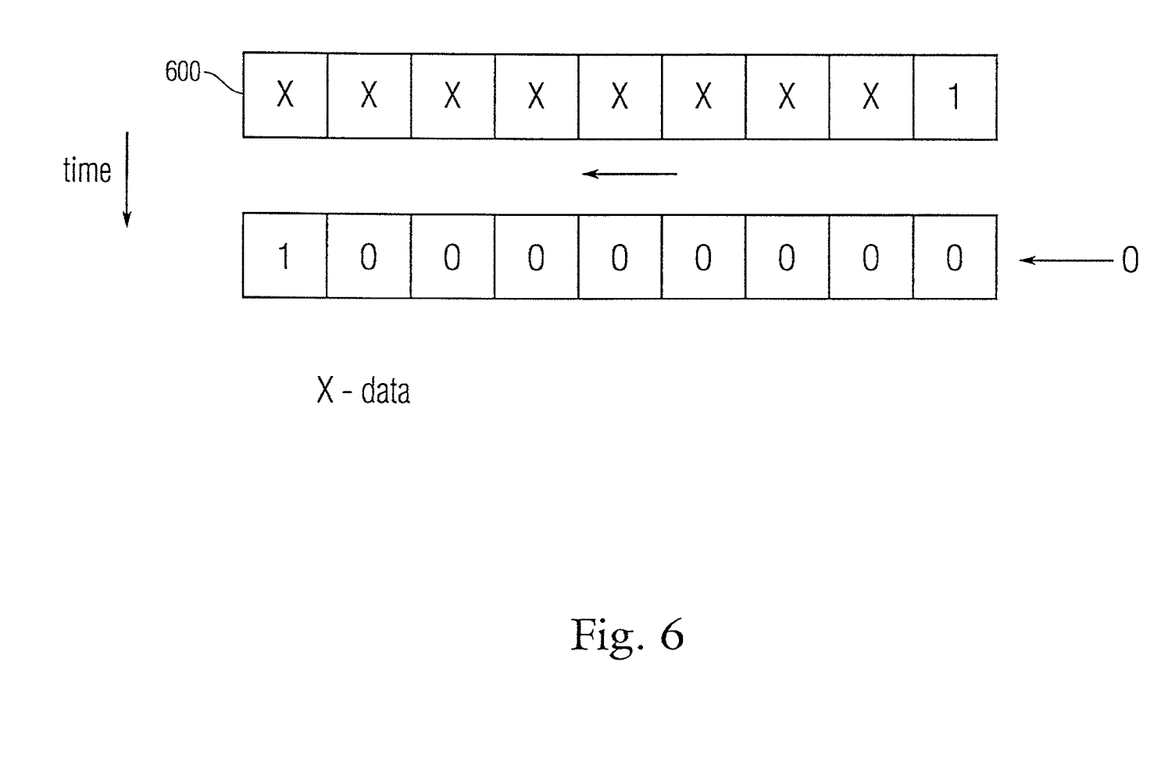
FIG. 6 is a diagram showing an exemplary scheme for determining whether a cell is filled with data according to one embodiment of the invention.

FIG. 6 is a diagram showing a scheme for determining whether a cell is filled with data or not. FIG. 6 shows a single cell at two points of time. While in the embodiments discussed herein, each cell is indicated as holding 8 bits of data, it can be seen that the cell of FIG. 6 can include 9 bits. The cell of FIG. 6 does in fact hold only 8 bits of data—the additional bit is a control bit used to determine whether the cell is empty or not.

Initially, the cell is in state 600. State 600 shows the cell immediately after it is loaded with data from the bus by the FIFO bus circuit. When the cell is loaded, 8 bits of data can be loaded into the leftmost eight bits of the cell. The rightmost bit can be loaded with the value 1, as shown. When the cell becomes active and it is read, the bits of the cell (including the rightmost 1) can be shifted to the left, while the left most bits are sent over the SPI interface. During this process, the FIFO is configured to shift in 0's from the right, so that any bits emptied by a shift are loaded with 0's. Eventually, when all data is shifted out, the cell enters state 601, in which the rightmost bit is a 1, and all other bits are 0's. At this point, the cell is empty. Therefore, various control circuits can determine whether the cell is full or empty by checking whether the leftmost 8 bits are all zeros.

Figure 7:
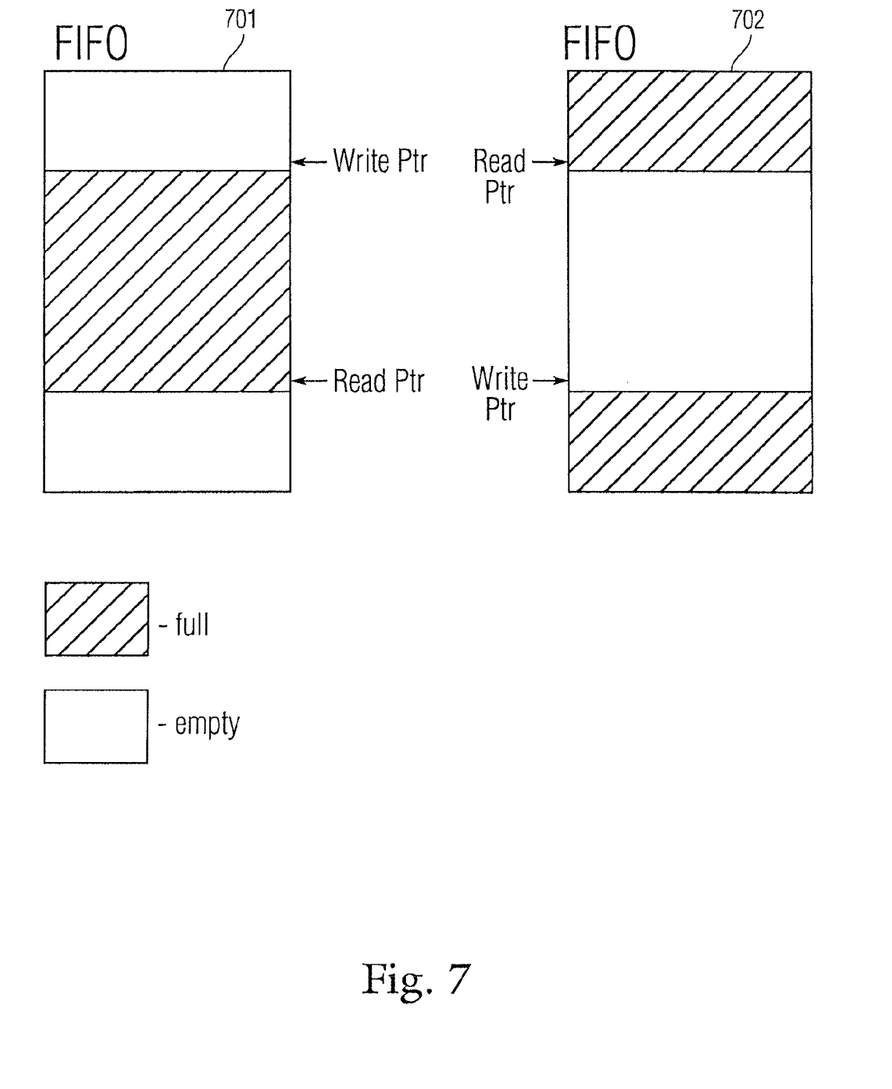
FIG. 7 is a diagram showing an exemplary scheme for determining the values of the read and write pointers according to one embodiment of the invention.

Circuitry within the FIFO processing circuit and/or the FIFO bus circuit may be able to determine whether each cell is full or empty in parallel using the method discussed in the context of FIG. 6. FIG. 7 shows a scheme for generating the values of the read and write pointers based on these determinations.

FIG. 7 shows two exemplary states of the FIFO. In state 701, a block of data can be positioned in the middle of the FIFO. In that case, the read pointer can be at the lowest full cell of that block, while the write pointer can be at the first empty cell higher than the highest full cell of the block. When data is read and written the read and write pointers can be incremented accordingly. Eventually, the write pointer can "overlap" the FIFO and return to the lowest cell of the FIFO incrementing from there. Thus, the FIFO may reach state 702. At that state the read pointer can be the lowest full cell of an interrupted block of full cells starting at the top of the FIFO, while the write pointer can be at the first empty cell higher than the highest full cell of an uninterrupted block of full cells at the bottom of the FIFO. A person of skill in the art can design digital circuitry which generates the read and write pointers according to the above discussed rules.

The diagram of FIG. 7 can be directed to embodiments which are designed to ensure that data is generally written in an uninterrupted block (except for a single interruption as shown in state 702). If, for any reason, the device requires or causes further interruptions in the data stored in the FIFO, other methods (which will be apparent to one skilled in the art) can be used to determine the read and write pointers.

A benefit of the method for determining the pointers discussed above can be that it does not rely on stored previous values of the pointers to determine their current values. Instead the method can rely on the immediate state of the FIFO. Thus, the present method can be more dependable, especially for the read pointer. As noted above, if the read pointer was implemented based on incrementing a stored value, it would have to depend on the SCLK, because the SCLK causes cells to be emptied which in turn requires for the read pointer value to be incremented. However, the SCLK may not be reliable as it may stop when the link is deactivated. Thus, the methods discussed in connection with FIGS. 6 and 7 can be a more reliable for generating the read pointer.

The FIFO processing circuit may generate both the read and the write pointers (sending the write pointer to the FIFO bus circuit). Alternatively, the FIFO processing circuit can generate the read pointer, while the FIFO bus circuit generates the write pointer. In some embodiments, where the bus clock is always on, the write pointer can be generated in the more traditional manner by incrementing a stored value based on the bus clock.

While the above discussion centered on the case when data is being received from the internal bus and sent over a SPI data line to another device, a person of skill in the art would recognize that the above discussed teachings can easily be applied to the case where data is received from another device over a SPI data line, and is sent to other modules in the host device over the internal bus.

In this latter case, the FIFO processing circuit can write data received over one of the data lines of the SPI (e.g., line 120) to the FIFO. The read pointer of FIG. 4 can be a write pointer instead. Data can be written by sequentially shifting it bits from the right into a cell of the FIFO indicated by the write pointer. Data coming over the SPI data line can be written by using the SCLK received from the master device. Data can be read and sent to the bus, by the FIFO bus circuit. The write pointer of FIG. 4 can be a read pointer instead. Data can be sent out on the bus in accordance to the bus clock.

A scheme similar to that of FIG. 6 can be used to determine whether each cell is empty or full. More specifically, when data from a cell is read and sent over the bus, that cell can be initialized by the FIFO bus circuit to a state of eight leading zeros and a 1 at the rightmost position (e.g., "000000001"). When data is sequentially stored into that cell, it can be shifted in from the right to the left, until the 1 which was initially at the rightmost position is at the leftmost position. In this case, a cell can be recognized as empty, if its leftmost 8 bits are all 0's.

The read and write pointers can be generated according to the scheme discussed in connection with FIG. 7.

As noted above, two different FIFOs (along with associated read and write circuitry) can be used in the interface 111. One FIFO can be entirely dedicated to sending data received from the bus out to another device, while the other can be dedicated to receiving data from another device and forwarding it to the bus. Thus, data can be sent and received simultaneously. Alternatively, the single FIFO 400 can be configured to operate in two modes—one for sending and one for receiving data.

As discussed above, embodiments of the invention are directed to interface circuits for synchronous protocols which do not rely on a dedicated high frequency clock signal. Instead, the interface circuit may rely on a clock signal received over the interface from another device in order to transfer data between the interface and an internal buffer. Furthermore, the interface circuit can rely on a clock signal provided by a bus for a device the interface circuit is located in to transfer data between the internal buffer and the bus.

In general, all circuitry used to communicate between the external connection (or network) and the FIFO (or buffer) can be referred to as network communication circuitry. All circuitry used to communicate between the buffer and the bus can be referred to as bus communication circuitry. As discussed above, as far as they rely on a clock, the network communication circuitry can run on the SCLK, while bus communication circuitry can run on the BCLK.

The internal buffer can be, but is not limited to a FIFO. Alternatively, it can be a stack or another data structure. The internal buffer can be configured so that each of its multiple of cells is a shift register. Thus, a preparatory step of moving a byte of data from the buffer to a separate shift register can be avoided. Each cell can be an 8 bit byte or of other lengths.

The interface circuits of the embodiments discussed above can be configured to operate in accordance with the SPI interface. However, this is not required. Alternatively, embodiments can be configured to operate with other synchronous interface protocols (even ones that are not serial).

Further embodiments of the invention can be directed to various devices that include the interface circuits discussed above. For example, embodiments of the invention can be directed to computers, keyboards, computer mice, speakers, mobile telephones, portable audio and/or video players, personal data assistants, automobiles, household appliances etc. Further embodiments of the invention can be directed to networks of devices comprising the interface circuits. The networks can be connected using the interface circuits. An exemplary network of two devices is shown in FIG. 1. Other networks may include a higher number of devices. For example, a network based on the SPI interface can include multiple devices, each connected to the master. The master can selectively communicate with each device by utilizing multiple chip select signals.

While most inventive features discussed above can be utilized by an interface circuit operating as a slave, most current interface circuits feature circuitry that enables them to operate alternatively both as a slave and as a master. Therefore, embodiments of the present invention may also apply to interface circuits, or devices including interface circuits that operate as a master but include the functionality to operate as a slave by taking advantage of the improvements discussed herein.

Although the present invention has been fully described in connection with embodiments thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. An master/slave serial peripheral interface (SPI) circuit comprising:
a master SPI interface including:
a master serial data output line;
a master serial data input line;
a master output interface clock line for transmitting interface clock signals; and
a slave SPI interface including:
a slave serial data input line connected to the master serial data output line;
a slave serial data output line connected to the master serial data input line;
a slave input interface clock line connected to the master output interface clock line for receiving the interface clock signals from the master SPI interface;
a buffer having a plurality of cells, each cell having a clock input for receiving the interface clock signals from the slave input interface clock line and operative to output data bits in response to the interface clock signals;
a multiplexer having inputs connected to outputs of each of the plurality of cells of the buffer and an output provided as the slave serial data output line;
a demultiplexer having an input connected to receive the interface clock signals and outputs connected to the clock inputs of the plurality of cells;
a read pointer processing circuit for generating a read pointer;
the multiplexer connected to receive the read pointer for connecting as an input thereto only a selected output of a cell designated by the read pointer;
the demultiplexer connected to receive the read pointer for connecting the interface clock signals from the serial input interface clock line connected to the master output interface clock line to only a selected output thereof for feeding the interface clock signals to the clock input of the cell designated by the read pointer;
the clock input of the cell designated by the read pointer receiving the interface clock signals and outputting the data bits stored therein in synchronism with the interface clock signals,
wherein
the multiplexer outputs the data bits stored it the cell designated by the read pointer over the slave serial data output line in synchronism with the interface clock signals without reference to a dedicated high frequency clock signal.

2. The master/slave serial peripheral interface circuit as recited in claim 1 wherein the slave interface further comprises:
a bus data line input for receiving the data bits of a host device, and
a bus clock line input for receiving bus clock signals of the host device;
bus control circuitry operable to load the data bits into the buffer in response to bus clock signals.

3. The master/slave serial peripheral interface circuit as recited in claim 2 wherein the buffer comprises a plurality of FIFO cells.

4. The master/slave serial peripheral interface circuit as recited in claim 3 wherein each of the plurality of FIFO cells comprises a shift register responsive to the interface clock signals to shift data bits stored therein.

5. The master/slave serial peripheral interface circuit as recited in claim 4 wherein the bus control circuitry comprises:

a first demultiplexer having an input connected to receive the bus clock signals and outputs connect to clock inputs of the FIFO cells of the buffer;
a second demultiplexer having an input connected to the bus data line for receiving the data bits to be stored and outputs connected to the inputs of the plurality of cells;
a bus circuit for generating a write pointer;
the first demultiplexer connected to receive the write pointer for connecting the bus clock signals to only a designated output thereof for feeding the bus clock signals to the cell designated by the write pointer;
the second demultiplexer connected to receive the write pointer for connecting the data bits only to a designated output thereof for feeding the data bits to the cell designated by the write pointer.

6. The master/slave serial peripheral interface circuit as recited in claim 3 wherein the bus control circuitry comprises:
a first demultiplexer having an input connected to receive the bus clock signals and outputs connect to clock inputs of the FIFO cells of the buffer;
a second demultiplexer having an input connected to the bus data line for receiving the data bits to be stored and outputs connected to the inputs of the plurality of cells;
a bus circuit for generating a write pointer;
the first demultiplexer connected to receive the write pointer for connecting the bus clock signals to only a designated output thereof for feeding the bus clock signals to the cell designated by the write pointer;
the second demultiplexer connected to receive the write pointer for connecting the data bits only to a designated output thereof for feeding the data bits to the cell designated by the write pointer.

7. An electronic device comprising at least the slave SPI interface as recited in claim 1.

8. A portable audio player comprising at least the slave SPI interface as recited in claim 1.

9. A mobile telephone comprising at least the slave SPI interface as recited in claim 1.

10. A flash drive comprising at least the slave SPI interface as recited in claim 1.

11. A master/slave serial peripheral interface (SPI) circuit comprising:
a master SPI interface including:
a master serial data output line;
a master serial data input line;
an master output interface clock line for transmitting interface clock signals;
a slave SPI interface including:
a slave serial data input line connected to the master serial data output line;
a slave serial data output line connected to the master serial data input line;
a slave input interface clock line connected to the master output interface clock line for receiving the interface clock signals from the master SPI interface;
a buffer having a plurality of cells, each cell having a clock input for receiving the interface clock signals from the slave input interface clock line and operative to store data bits therein and to output the data bits in response to the interface clock signals;
means for designating ones of the plurality of cells of the buffer;
means, responsive to the interface clock signals, for transmitting data bits from the designated ones of the plurality of cells to the slave serial data output line in synchronism with the interface clock signals received from the slave input interface clock line.

12. The master/slave serial peripheral interface circuit as recited in claim 11 wherein the slave SPI interface further comprises:
a bus data line of a bus of a host device comprising the slave SPI interface, and
a bus clock line of the bus configured to transmit bus clock signals;
bus control circuitry operable to load data into the buffer in response to bus clock signals.

13. The master/slave serial peripheral interface circuit as recited in claim 12 wherein the buffer comprises a plurality of FIFO cells.

14. The master/slave serial peripheral interface circuit as recited in claim 13 wherein each of the plurality of FIFO cells comprises a shift register responsive to the interface clock signals to shift data bits stored therein.

15. The master/slave serial peripheral interface circuit as recited in claim 11 wherein the buffer comprises a plurality of FIFO cells.

16. The master/slave serial peripheral interface circuit as recited in claim 15 wherein each of the plurality of FIFO cells comprises a shift register responsive to the interface clock signals to shift data bits stored therein.

17. An electronic device comprising at least the slave SPI interface as recited in claim 11.

18. A portable audio player comprising at least the slave SPI interface as recited in claim 11.

19. A mobile telephone comprising at least the slave SPI interface as recited in claim 11.

20. A flash drive comprising at least the slave SPI interface as recited in claim 11.

21. An master/slave serial peripheral interface (SPI) circuit comprising:
a master SPI interface including:
a master serial data output line;
a master serial data input line;
an master output interface clock line for transmitting interface clock signals;
a slave SPI interface including:
a slave serial data input line connected to the master serial data output line;
a slave serial data output line connected to the master serial data input line;
a slave input interface clock line connected to the master output interface clock line for receiving the interface clock signals from the master SPI interface;
a buffer circuit including a plurality of shift register cells, each cell having a clock input for receiving the interface clock signals from the slave input interface clock line and operative to store data bits therein and to output the data bits in response to the interface clock signals;
a pointer circuit for generating a pointer for designating ones of the plurality of cells of the buffer;
wherein
the buffer circuit is operative, in response to the pointer and the interface clock signals for transmitting data bits from the designated ones of the plurality of cells to the slave serial data output line in synchronism with the interface clock signals received from the slave input interface clock line.

22. The master/slave serial peripheral interface circuit as recited in claim 21, wherein the slave SPI interface further comprises:
a bus data line of a bus of a host device comprising the slave SPI interface, and a bus clock line of the bus configured to transmit bus clock signals;

bus control circuitry operable to load data into the buffer in response to bus clock signals.

23. The master/slave serial peripheral interface circuit as recited in claim 22, wherein the buffer comprises a plurality of FIFO cells.

24. The master/slave serial peripheral interface circuit as recited in claim 23, wherein each of the plurality of FIFO cells comprises a shift register responsive to the interface clock signals to shift data bits stored therein.

25. An electronic device comprising at least the slave SPI interface as recited in claim 21.

26. A portable audio player comprising at least the slave SPI interface as recited in claim 21.

27. A mobile telephone comprising at least the slave SPI interface as recited in claim 21.

28. A flash drive comprising at least the slave SPI interface as recited in claim 21.

29. A slave interface in a master/slave peripheral interface SPI circuit having a master SPI, the slave interface comprising:
a slave SPI interface including:
a slave serial data input line;
a slave serial data output line;
a slave input interface clock line connectable to receive interface clock signals from the master SPI interface;
a buffer having a plurality of cells, each cell having a clock input for receiving the interface clock signals from the slave input interface clock line and operative to output data bits in response to the interface clock signals;
a multiplexer having inputs connectable to outputs of each of the plurality of cells of the buffer and an output provided as the slave serial data output line;
a demultiplexer having an input connectable to receive the interface clock signals and outputs connected to the clock inputs of the plurality of cells;
a read pointer processing circuit for generating a read pointer;
the multiplexer connected to receive the read pointer for connecting as an input thereto only a selected output of a cell designated by the read pointer;
the demultiplexer connected to receive the read pointer for connecting the interface clock signals from the serial input interface clock line connected to a master output interface clock line to only a selected output thereof for feeding the interface clock signals to the clock input of the cell designated by the read pointer;
the clock input of the cell designated by the read pointer receiving the interface clock signals and outputting the data bits stored therein in synchronism with the interface clock signals,
wherein
the multiplexer outputs the data bits stored in the cell designated by the read pointer over the slave serial data output line in synchronism with the interface clock signals without reference to a dedicated high frequency clock signal.

30. An electronic device incorporating the slave SPI interface as recited in claim 29.

31. A portable audio player incorporating the slave SPI interface as recited in claim 29.

32. A mobile telephone incorporating the slave SPI interface as recited in claim 29.

33. A flash drive incorporating the slave SPI interface as recited in claim 29.

34. The slave interface as recited in claim 29 further comprises:
a bus data line input for receiving the data bits from a host device, and
a bus clock line input for receiving bus clock signals of the host device;
bus control circuitry operable to load the data bits into the buffer in response to bus clock signals.

35. The slave interface as recited in claim 34, wherein the buffer comprises a plurality of FIFO cells.

36. The slave interface as recited in claim 35, wherein each of the plurality of FIFO cells comprises a shift register responsive to the interface clock signals to shift the data bits stored therein.

37. The slave interface as recited in claim 36, wherein the bus control circuitry comprises:
a first demultiplexer having an input connectable to receive the bus clock signals and outputs connectable to clock inputs of the FIFO cells of the buffer;
a second demultiplexer having an input connectable to the bus data line input for receiving the data bits to be stored and outputs connected to the inputs of the plurality of cells;
a bus circuit for generating a write pointer;
the first demultiplexer connected to receive the write pointer for connecting the bus clock signals to only a designated output thereof for feeding the bus clock signals to the cell designated by the write pointer;
the second demultiplexer connected to receive the write pointer for connecting the data bits only to a designated output thereof for feeding the data bits to the cell designated by the write pointer.

38. A slave interface in a master/slave serial peripheral interface SPI circuit having a master SPI interface, the slave interface comprising:
a slave SPI interface including:
a slave serial data input line;
a slave serial data output line;
a slave input interface clock line connectable to receive interface clock signals from the master interface;
a buffer having a plurality of cells, each cell having a clock input for receiving the interface clock signals from the slave input interface clock line and operative to store data bits therein and to output the data bits in response to the interface clock signals;
means for designating ones of the plurality of cells of the buffer;
means, responsive to the interface clock signals, for transmitting the data bits from the designated one of the plurality of cells to the slave serial data output line in synchronism with the interface clock signals received from the slave input interface clock line.

39. A slave interface in a master/slave serial peripheral interface (SPI) circuit having a master interface, the slave interface comprising:
a slave SPI interface including:
a slave serial data input line;
a slave serial data output line;
a slave input interface clock line connectable to receive interface clock signals from the master interface;
a buffer circuit including a plurality of shift register cells, each cell having a clock input for receiving the interface clock signals from the slave input interface clock line and operative to store data bits therein and to output the data bits in response to the interface clock signals;
a pointer circuit for generating a pointer for designating ones of the plurality of cells of the buffer;

wherein
the buffer circuit is operative, in response to the pointer and the interface clock signals for transmitting data bits from the designated ones of the plurality of cells to the slave serial data output line in synchronism with the interface clock signals received from the slave input interface clock line.

40. In a slave interface, a method of transmitting data from the slave interface to a master interface over a serial peripheral interface (SPI) comprising:
storing data bits in a plurality of shift register cells of a buffer, each shift register cell having clock inputs;
receiving interface clock signals from the master interface;
designating one of the plurality of cells of the buffer;
feeding the interface clock signals to the clock inputs of only the designated one of the plurality of cells of the buffer;
serially transmitting the data bits form only the designated one of the plurality of cells to the master interface in synchronism with the interface clock signals received from the master interface;
designating another of the plurality of cells of the buffer;
feeding the interface clock signals to the clock inputs of only the designated another of the plurality of cells of the buffer; and
serially transmitting the data bits from only the designated another of the plurality of cells to the master interface in synchronism with the interface clock signals received from the master interface.

* * * * *